(No Model.) 3 Sheets—Sheet 2.

R. HOEFT.

VEHICLE SPRING BRACE.

No. 341,242. Patented May 4, 1886.

Witnesses:
Frank G. Blanchard
Anton Schoeninger

Inventor:
Rudolph Hoeft
By Wm. H. Lotz
Attorney (No Model.) 3 Sheets—Sheet 3.
R. HOEFT.
VEHICLE SPRING BRACE.
No. 341,242. Patented May 4, 1886.
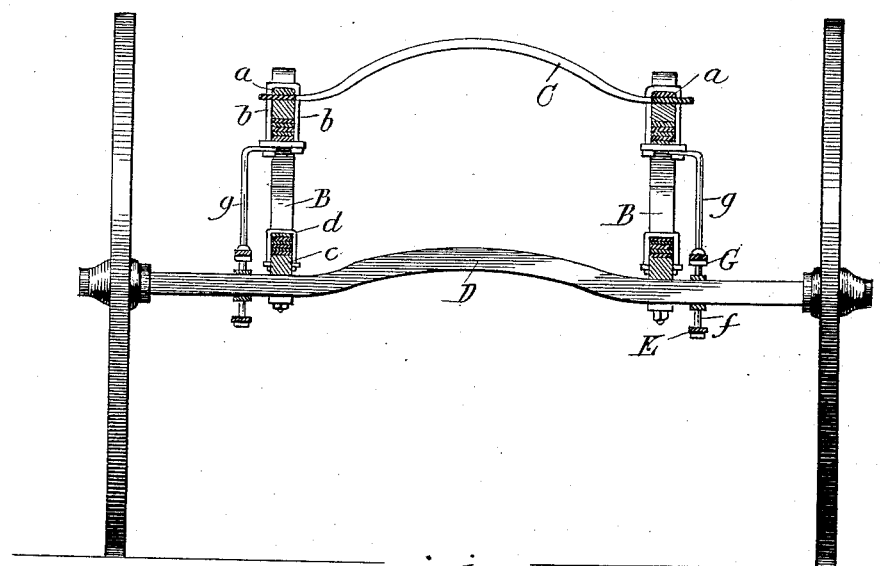
Fig. 4.
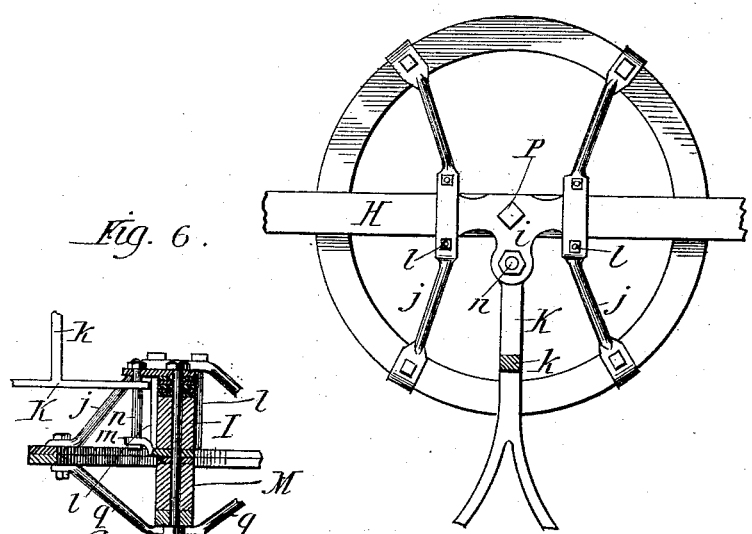
Fig. 5.
Fig. 6.
Fig. 7.
Witnesses:
Frank J. Blanchard
Anton Schoeninger
Inventor:
Rudolph Hoeft
By Wm H Lotz
Atty.

United States Patent Office.

RUDOLPH HOEFT, OF CHICAGO, ILLINOIS.

VEHICLE-SPRING BRACE.

SPECIFICATION forming part of Letters Patent No. 341,242, dated May 4, 1886.

Application filed February 23, 1886. Serial No. 192,840. (No model.)

*To all whom it may concern:*

Be it known that I, RUDOLPH HOEFT, a citizen of the United States of America, residing at Chicago, in the county of Cook and State of Illinois, have invented certain new and useful Improvements in Vehicles, of which the following is a specification, reference being had therein to the accompanying drawings.

The object I have in view is to produce a spring-wagon in which the running-gear is so connected with and braced to the wagon-bed that no reach is required; and for that purpose my invention consists of the novel devices and combinations of devices hereinafter described and specifically claimed.

Figure 1:
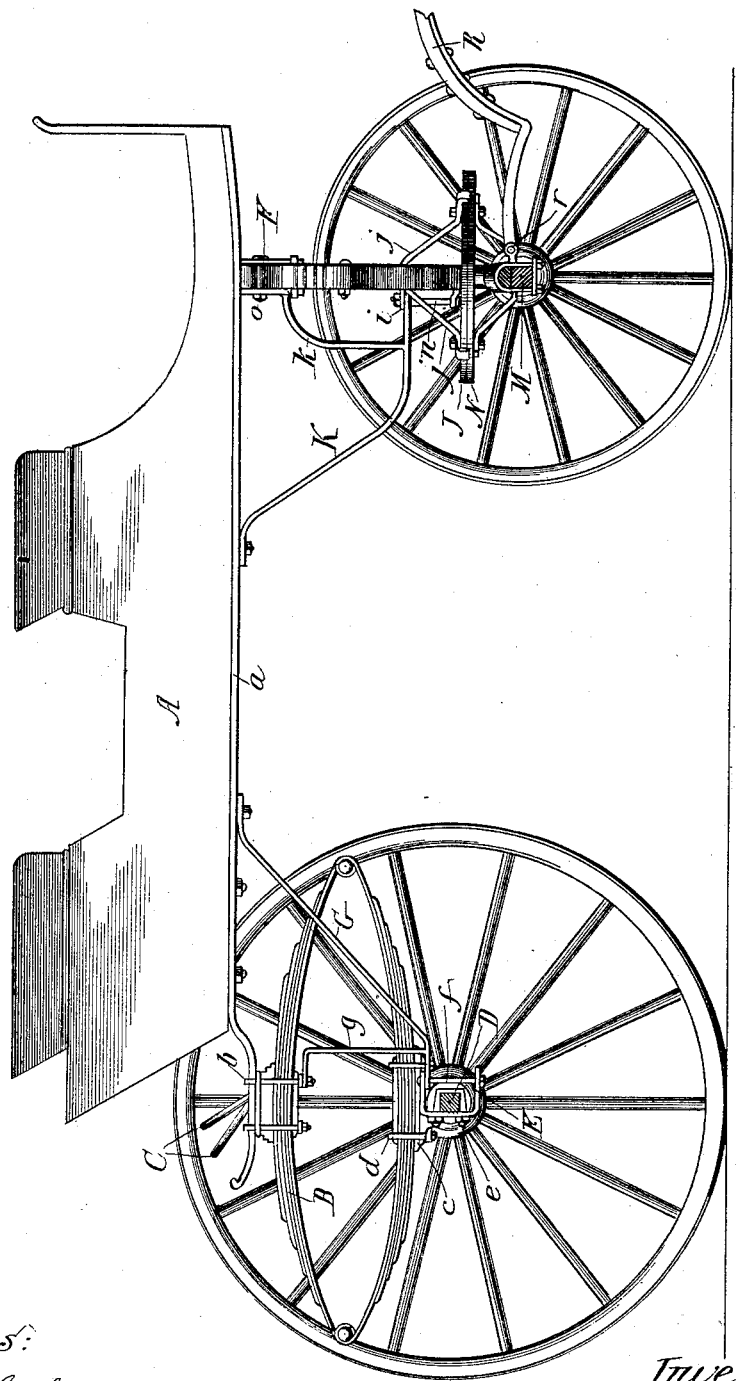
Figure 2:
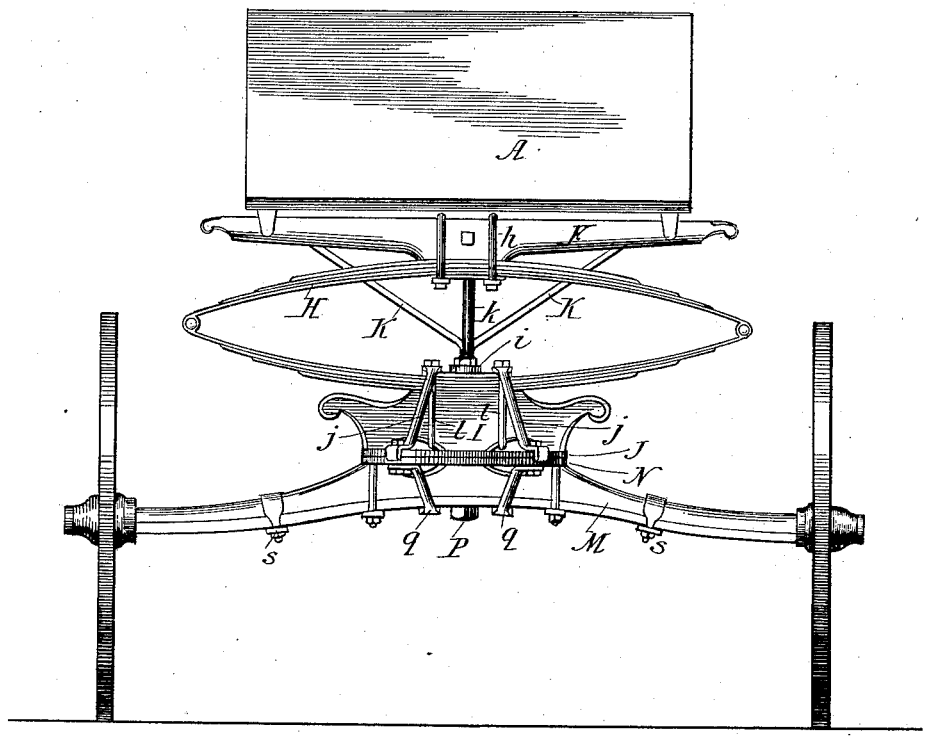
Figure 3:
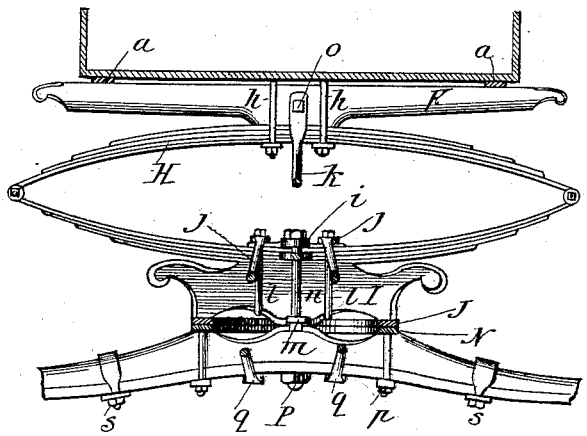

In the accompanying drawings, Figure 1 represents a side elevation of the vehicle; Fig. 2, a front elevation; Fig. 3, a sectional rear elevation of its front part; Fig. 4, a sectional elevation of the rear part of the running-gear; Fig. 5, a plan of the fifth-wheel; Fig. 6, a longitudinal vertical section of the fifth-wheel, and Fig. 7 a section of the rear axle, showing one of its brace-connections.

Corresponding letters in the several figures of the drawings designate like parts.

A denotes the bed of the vehicle, which may be of any style. Longitudinally under each side of the bed is secured an iron bar, $a$, which for light and short wagon-beds extend rearwardly beyond the end thereof. Under the rear extension of each bar $a$ is secured by two U-bolts, $b$, the upper half of an elliptic spring, B, and between such bar $a$ and spring B is secured by the same U-bolts $b$ the end of a double spring-bar, C, that forms a connection between the upper halves of the two springs B.

Upon the rear axle, D, are clamped by suitable bolts two saddle-blocks, $c$, upon each of which again is secured by U-bolts $d$ the lower half of one of the springs B. A clevis, E, is clamped upon the axle D, exteriorly of each spring B by a U-bolt, $e$, and through the eye ends of such clevis is passed a vertical bolt, $f$. A brace-bar, G, extending at each side diagonally rearward from under the body of the vehicle, where its end is secured by bolts under bar $a$, has an eye to its lower rear end, through which the bolt $f$ is passed, and near the rear end, each brace-bar G has a vertical arm, $g$, with an upper horizontal bend, where it is secured under the upper half of the spring B by one of the U-bolts $b$. Each brace G thus being rigid with the bed of the vehicle, the axle is guided vertically, as the springs B are compressed by bolts $f$, sliding in the end loops of such brace-bars, thus allowing a free play to such springs vertically, and yet holding the axle horizontally on its proper position relative to the wagon-bed.

F is a bolster fixed under the front of the wagon-bed, and H an elliptic spring secured under the center of such bolster by two U-bolts, $h$.

I is the saddle for the spring, and J the upper ring of the fifth-wheel. A plate, $i$, having an eye projection is placed upon the spring, and over the ends of this plate $i$ are passed two brace-rods, $j$, that, with their ends, are secured by screws upon ring J. U-bolts $l$ are passed around the saddle I, with their screw-threaded ends projected through holes in brace-rods $j$, where, by nuts, they are tightened to clamp the parts together. A plate, $m$, also having an eye projection is secured under the saddle-block, the projecting eyes of plates $i$ and $m$ being vertically in line for securing a bolt, $n$. A double or V-shaped brace-bar, K, the two arms of which extend diagonally rearward to the wagon-bed, where their ends are secured by bolts under the bars $a$, has an eye to its forward end, through which is passed the bolt $n$. This brace K also has a vertical arm, $k$, that is curved on top, where it is secured by a bolt, $o$, to the bolster F in a manner that such brace is held rigid with the wagon-bed, and that the saddle-block is guided vertically to allow compression and free play of spring H, in a similar manner as described for the rear axle. Upon the front axle, M, is secured by bolts $p$ and brace-rods $q$ the ring N, that is of corresponding size with ring J, which together form the fifth-wheel, the king-bolt P being passed through the plate $i$, spring H, saddle I, plate $m$, and through axle M, thus pivotally securing the same. The couplings $r$, for thill R, are secured to the axle M by U-bolts $s$ in the usual manner.

A vehicle thus constructed is not only light and handsome in appearance, but is also very strong and durable, and there being no reach in the way it can be turned a very short curve.

What I claim is—

1. The combination, with a vehicle-bed, a spring, and an axle, of a solid brace-rod secured at one end rigidly to the bed and arranged at the other end to permit the vertical movement of the axle, said rod being provided with a rigid rod or extension secured to the spring, as set forth.

2. The combination, with vehicle-bed A, spring B, and axle D, of clevises E, with bolts f, and of brace-bar G g, all substantially as described, for the purpose specified.

3. The combination, with vehicle-bed A, spring H, and fifth-wheel J, of brace K k, adapted to hold such fifth-wheel horizontally to the wagon-bed and at the same time to allow vertical movement, substantially as and for the purpose set forth.

4. The combination, with vehicle-bed A, spring H, and fifth-wheel J, of bolt n and brace-bar K k, all substantially as described, for the purpose specified.

In testimony whereof I affix my signature in presence of two witnesses.

RUDOLPH HOEFT.

Witnesses:
ANTON SCHOENINGER,
RAYMOND F. SAYERS.